Nov. 4, 1952     A. WINTHER     2,617,053
ELECTRIC CLUTCH

Filed Oct. 30, 1950     2 SHEETS—SHEET 1

Anthony Winther, Inventor.
Koenig and Pope,
Attorneys.

Nov. 4, 1952 — A. WINTHER — 2,617,053
ELECTRIC CLUTCH
Filed Oct. 30, 1950 — 2 SHEETS—SHEET 2

Anthony Winther, Inventor.
Koenig and Pope, Attorneys.

Patented Nov. 4, 1952

2,617,053

UNITED STATES PATENT OFFICE 2,617,053

ELECTRIC CLUTCH

Anthony Winther, Kenosha, Wis., assignor to Martin P. Winther, Waukegan, Ill., as trustee Application October 30, 1950, Serial No. 192,941

12 Claims. (Cl. 310—106)

1

This invention relates to electric clutches, and more specifically to eddy-current clutches useful as slip couplings, brakes, dynamometers and the like, and in which the driving and driven elements may be both rotary or one of them stationary, as may be required in any machines of this class.

The invention has particular application to apparatus of the above class wherein an axially wide eddy-current drum is desirable for increased cooling effects, but the invention is not limited to such cases. Among the several objects of the invention may be noted the provision of a structure in which certain leakage flux such as is now usual in apparatus of this general class is made available at the working flux gap to increase torque and to provide a rising torque-speed curve. Other objects will be in part apparent and in part pointed out hereinafter.

Briefly, the invention consists in relatively rotary field and inductor members of substantial width so that the inductor member inherently loses heat at a more rapid rate than narrower members, and so that the field member has lower flux leakage, whereby a more efficient effective flux field may be obtained from the field coils. The field member is of a form inherently convenient to carry out in width, being composed of a central section having interdigitated polar teeth served by one annular field coil, and sections having noninterdigitated polar teeth respectively served by lateral annular field coils, the arrangement being such that the interaction of the resulting toroidal flux fields from said coils minimizes certain useless flux leakage.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is an axial section of an exemplary machine embodying the invention;

2

Figure 4:
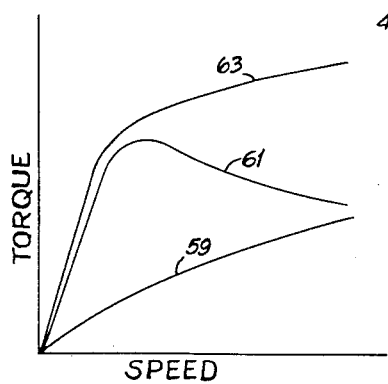

Fig. 4 is an illustrative set of torque-speed curves for explanatory purposes.

Similar reference characters indicate corresponding parts throughout the several views of the drawings.

Figure 1:
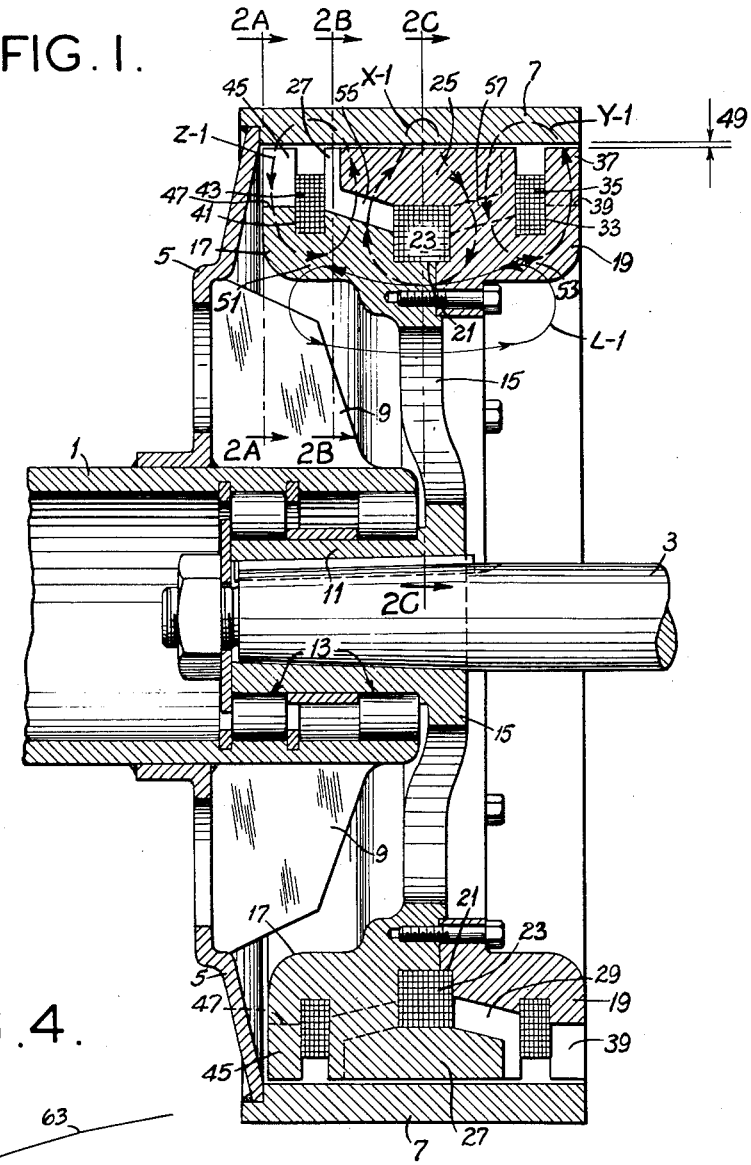

Referring now more particularly to Fig. 1, there is shown at numeral 1 a driving sleeve and at 3 a driven shaft, but it will be understood that the driving and driven relationships of these may be reversed. Welded to the sleeve 1 is a supporting disc 5, to the rim of which is welded an eddy-current inductor drum 7 composed of magnetizable material such as iron or steel. As indicated, the drum has a substantial width, axially considered. Its thickness is sufficient for strength under the rotary speeds imposed. It acts as a suitable conductor for the eddy currents which flow therein, as explained below. Associated with the hub 1 and the disc 5 are blades 9, which function as an air-cooling fan.

Figure 2:
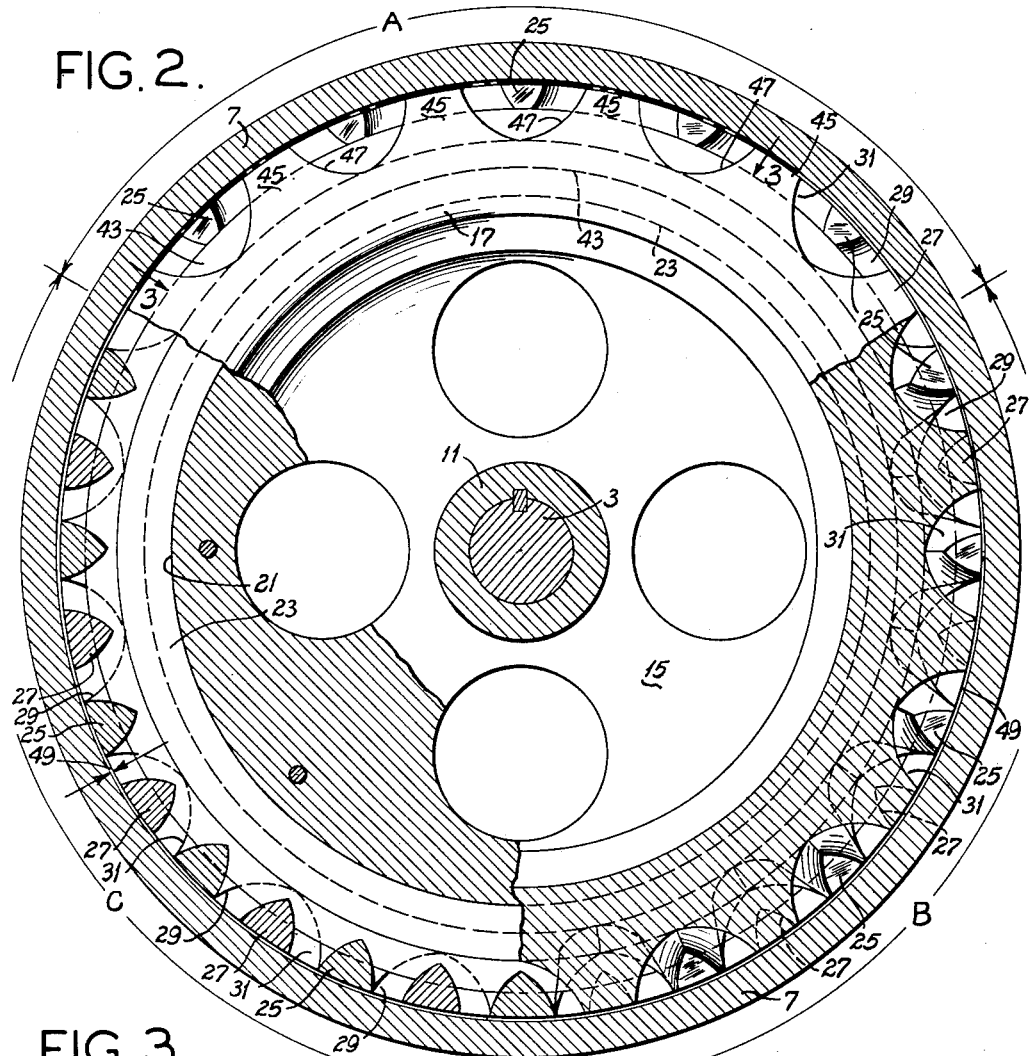
Fig. 2 is a composite cross section, sector A of which is taken on line 2A—2A of Fig. 1; sector B on line 2B—2B of Fig. 1; and sector C on line 2C—2C of Fig. 1.

Anchored to the shaft 3 is a hub 11 between which and hub 1 is an anti-friction pilot bearing 13. Extending from the hub 11 is an open spider 15 having a rim in the form of a ring 17, to which is bolted a ring 19. Rings 17 and 19 are also composed of magnetizable material such as iron or steel. Where the rings 17 and 19 face one another, a groove 21 is provided for the reception of a central annular field coil 23. Extending from ring 19 are claw-type polar teeth 25, which envelope the coil 23 on two sides. These teeth 25 are separated by spaces 29 (see section B of Fig. 2), said spaces extending down into the ring 19. Extending from the other ring 17 are complementary claw-type polar teeth 27, which envelope the coil 23 on two sides. Teeth 25 and 27 interdigitate. These teeth 27 are separated by spaces 31 (see again section B of Fig. 2), said spaces extending partially down into the ring 17.

Figure 3:
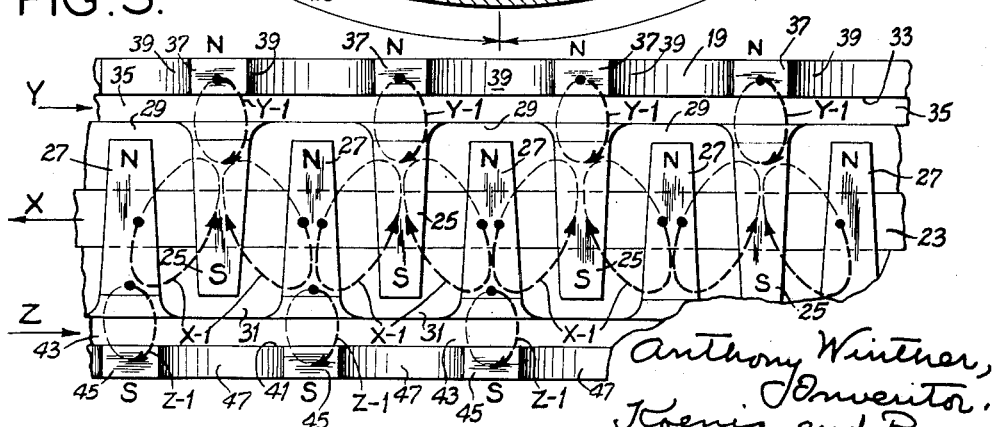
Fig. 3 is a surface development of the pole faces of the field member as viewed on line 3—3 of Fig. 2, showing certain pole relationships, and in schematic dotted lines certain flux field relationships.

Ring 19 is grooved outside of the teeth 25, as shown at 33, for the reception of an annular coil 35 preferably having a number of ampere turns one-half that of coil 23. Outside of coil 35 the ring 19 is provided with plain radial polar teeth 37 having spaces 39 between them. Teeth 37 are axially in line with the heels of claw teeth 25, and the spaces 39 are axially in line with the spaces 29 (Fig. 3). Ring 17 is grooved, as shown at 41, outside of the teeth 27 for the reception of an annular coil 43, preferably having a number of ampere turns also one-half that of coil 23. Outside of the coil 43 the ring 17 is provided with plain radial polar teeth 45 having spaces 47 between them. Teeth 45 are axially in line with the heels of claw teeth 27, and spaces 47 are axially in line with the spaces 31. Thus it will be seen that since the claw teeth 25 interdigitate around coil 23, the plain radial teeth 37 and 45 are staggered, being in line with the claw teeth 25 and 27 (on their respective rings 19 and 17). The inside of the eddy-current inductor drum 7 is cylindrically machined as are the outsides of the polar teeth 25, 27, 37 and 45 to allow for a small cylindric magnetic gap 49 of the order of a few thousandths of an inch (.020, for example).

The coils 23, 35 and 43 are excited by suitable collector rings and an electric circuit connected into the field member, which it is unnecessary to show because such are well-known in the art. If the annular direction of current flow in the central coil 23 is in the direction shown by the straight arrow X in Fig. 3, the direction of current flow for coil 35 is caused to be as shown by arrow Y, and the direction of current flow for coil 43 is caused to be as shown by arrow Z. Stated more broadly, the current flows through coils 35 and 43 are in the same direction, but opposite to the flow in coil 23. As a result, the toroidal flux fields will loop their respective coils as illustrated by dash lines at X-1, Y-1 and Z-1 in Fig. 1.

The loop of the toroidal field X-1 in Fig. 1 may be traced clockwise through ring 17, through and out of teeth 27 (which are on the ring 17), into the drum 7, then out of the drum 7 across gap 49 and into teeth 25, ring 19 (on which teeth 25 are located) and back to ring 17. Thus coil 23 is completely looped by the toroidal field X-1, said field leaving from the claw poles 27 as north poles N and entering the claw poles 25 as south poles S which are both appropriately marked in Fig. 3. It is understood that all dash lines illustrating flux fields are diagrammatic and show significant general directions of flux for illustration and discussion.

The loop of the toroidal flux field Y-1 is counterclockwise, passing through ring 19, out of teeth 37, across gap 49 into the drum 7 and returning across gap 49 into the teeth 25 and back to the ring 19 (Fig. 1).

The loop of the toroidal flux field Z-1 is also counterclockwise, passing through ring 17, out of teeth 27, across gap 49 into the drum 7 and returning across gap 49 into the teeth 47 and back to the ring 17 (Fig. 1).

The particular elliptical forms in Fig. 3 are significant only as showing general flux loops between poles. In Fig. 3 the dots on north poles indicate a condition of flux exit from the respective poles, making them north (N). The arrowheads indicate a condition of flux entry, making the respective poles south (S). The dots and arrowheads are not localizations of flux emanation and flux entry but are illustrative of general flux conditions over the pole face. Thus the entire surfaces of all poles marked north (N) and south (S) facing the gap 49 are of the polarities indicated and not simply the local regions near the dots and arrows. It is to be understood in connection with Fig. 3 that the overlying drum 7 does not appear.

Referring to Fig. 3, heavy dash lines in flux field X-1 indicate flow across the gap and through the drum 7. The light dash lines in connection with this field X-1 diagram the completion of the toroidal magnetic circuit for each pair of poles, passing through rings 17 and 19. The small ellipses at the top of Fig. 3 represent the toroidal flux field Y-1, the circuit of which is through ring 19 out of teeth 37 (making them north) across gap 49 into drum 7, out of drum 7 across gap 49 into claw teeth 25, which are south, and back into ring 19. As above noted, the heavy dash lines in Fig. 3 indicate traverse of the fields Y-1 through the drum 7.

The small ellipses in the lower portion of Fig. 3 represent the toroidal flux field Z-1, the circuit of which is through ring 17 out of claw teeth 27 (which are north) across gap 49 into drum 7, out of drum 7 across gap 49 into teeth 45, which are south, and back into ring 17. Again heavy dash lines in Fig. 3 indicate traverse of the field Z-1 through the drum 7.

The large ellipses in the middle of Fig. 3 represent the toroidal flux field X-1. This field in looping coil 23 (Fig. 1), also passes from adjacent north poles 27 out into the drum 7 and back into south poles 25, as diagrammatically indicated.

Upon relative motion between the members 1 and 3, the movement of the fields X-1, Y-1 and Z-1 throughout the drum 7 engender eddy currents which in turn produce a reactive magnetic field, causing a driving magnetic coupling. This is operative with some rotary slip which decreases with increase in excitation of the field coils 23, 35 and 43.

An underlying advantageous result of the above arrangement is illustrated in Fig. 1, wherein L-1 illustrates the usual position of the leakage flux from an eddy-current clutch with two bands of poles such as 25 and 27. In the case of the present invention this leakage circuit is practically eliminated, or at least attenuated, because of the bucking and deflecting actions of toroidal flux circuits Y-1 and Z-1 where they graze the leakage flux circuit L-1, as shown by the opposite oppositely directed arrowheads at numerals 51 and 53. On the other hand the non-leaking portions of the toroidal flux circuits X-1, Y-1 and Z-1 which pass through the drum 7 reinforce each other at their grazing points, such as shown by the similarly directed arrowheads at 55 and 57. Thus what would ordinarily be leakage flux is diverted to and available at the flux gap 49.

The result of bucking and deflecting the leakage flux L-1 so as to divert substantially all flux through the gap 49 is as shown in Fig. 4. In this figure the curve 59 shows the general type of torque-speed curve that is obtained from a machine employing poles only such as the end poles 37 and 45. Curve 61 shows the general type of torque-speed curve that is obtained from a machine employing interdigitated poles such as 25 and 27. The employment of the combination as above described results in a torque-speed curve such as shown at 63, which is a rising curve quite useful for many applications of eddy-current apparatus of this class.

It will be clear that while all of the various specific factors of the invention above enumerated are important to obtaining best results, some of the factors may be varied and many of the improvements, if not all, obtained. For example, the teeth 25 and 27 may under some circumstances be other than of the claw type, in which event they need not be staggered as is necessitated by the fact that they are of the claw type. In such event, the teeth 37 and 47 will still be in axial alignment with teeth such as 25 and 27, whether the latter are of the claw type or not, and whether or not they are in staggered arrangement.

It will also be clear that bucking and diversion of the leakage flux field L-1 to the air or flux gap 49 may be partially accomplished by having the sum of the ampere turns in coils 35 and 43 less than the ampere turns in coil 23; and in some designs more turns in this sum than ampere turns in coil 23 may be useful.

It will also be understood that although the invention is shown with the field member constructed inside of the eddy-current drum (the poles extending outward), this relationship of parts may be reversed with the field member outside of the drum (the poles extending inwardly toward the drum). This constitutes a mere inversion wherein the general principles of operation of the invention are essentially the same.

It will be seen that the arrangement is such that there is parallel flow of flux where toroidal fields X-1 and Z-1 abut and where toroidal fields X-1 and Y-1 abut. But at 51 and 53 the circuits Y-1 and Z-1 buck out the potential leakage flux L-1. It will be understood in this connection that the leakage flux circuit L-1 on Fig. 1 is only illustrative of where it would be if coils 35 and 43 were not employed according to the invention; and that actually this circuit L-1 substantially does not exist in the case of the present invention.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electric clutch comprising driving and driven members one of which consists of a magnetizable eddy-current drum and the other of which consists of a polar field member comprising an intermediate annular field coil and lateral field coils, groups of claw-type teeth extending respectively from between the intermediate and lateral coils and interdigitating axially across the intermediate coil, and groups of endwise polar teeth located outside of said lateral coils.

2. Apparatus made according to claim 1, wherein the current flows are in the same direction in each lateral coil but opposite to the flow of current in the intermediate coil.

3. An electric clutch made according to claim 1, wherein the members of each group of endwise polar teeth adjacent a lateral coil are respectively in substantial alignment with the members of a group of claw-type polar teeth on the other side of the same coil.

4. Apparatus made according to claim 1, wherein each group of endwise polar teeth adjacent a lateral coil is in substantial alignment with the group of claw-type teeth on the other side of the same coil, and wherein the current flows are in the same direction in each lateral coil but opposite to the flow of current in the intermediate coil.

5. Apparatus made according to claim 1, wherein the number of ampere turns in the intermediate coil are substantially equal to the sum of the ampere turns in the lateral coils.

6. Apparatus made according to claim 1, wherein the current flows are in the same direction in each lateral coil but opposite to the flow of current in the intermediate coil, and wherein the number of ampere turns in the intermediate coil are substantially equal to the sum of the ampere turns in the lateral coils.

7. Apparatus made according to claim 1, wherein the members of each group of endwise polar teeth adjacent a lateral coil are respectively in substantial alignment with the members of the group of claw-type teeth on the other side of the same coil, and wherein the current flows are in the same direction in each lateral coil but opposite to the flow of current in the intermediate coil.

8. Apparatus made according to claim 1, wherein the members of each group of endwise polar teeth adjacent a lateral coil are respectively in substantial alignment with the members of the group of claw-type teeth on the other side of the same coil; wherein the current flows are in the same direction in each lateral coil but opposite to the flow of current in the intermediate coil; and wherein the number of ampere turns in the intermediate coil are substantially equal to the sum of the ampere turns in the lateral coils.

9. An electric clutch comprising driving and driven members one of which consists of a magnetizable eddy-current drum and the other of which consists of a polar field member comprising an intermediate annular field coil and lateral field coils, groups of spaced teeth extending respectively from between the intermediate and lateral coils, and groups of spaced endwise polar teeth respectively located outside of said lateral coils, the spaced members of each group of endwise polar teeth being respectively in substantial alignment with the spaced members of the group of teeth on the other side of the same coil.

10. Apparatus made according to claim 9, wherein the current flows are in the same direction in each lateral coil but opposite to the flow of current in the intermediate coil.

11. Apparatus made according to claim 10, wherein the members of the respective groups of teeth extending from between the respective intermediate and lateral coils are peripherally staggered.

12. Apparatus made according to claim 9, wherein the members of the respective groups of teeth extending from between the respective intermediate and lateral coils are peripherally staggered, and wherein the current flows are in the same direction in each lateral coil but opposite to the flow of the current in the intermediate coil.

ANTHONY WINTHER.

REFERENCES CITED

The following references are of record in the file of this patent:

UNITED STATES PATENTS

| Number | Name | Date |
| --- | --- | --- |
| 2,367,636 | Winther | Jan. 16, 1945 |